United States Patent [19]

Lerman et al.

[11] Patent Number: 5,116,178
[45] Date of Patent: May 26, 1992

[54] SAFETY CABLE FOR FASTENERS

[75] Inventors: Theodore B. Lerman; Bernard W. Basse, both of Cincinnati, Ohio

[73] Assignee: General Electric Company, Cincinnati, Ohio

[21] Appl. No.: 600,293

[22] Filed: Oct. 22, 1990

Related U.S. Application Data

[63] Continuation of Ser. No. 324,501, Mar. 16, 1989, abandoned.

[51] Int. Cl.⁵ ............................................. F16B 39/04
[52] U.S. Cl. .................................... 411/87; 411/966; 403/316; 403/320
[58] Field of Search ............... 403/3, 154–155, 403/165, 270, 271, 284, 316, 320, 360, 212, 284; 411/87, 966

[56] References Cited

U.S. PATENT DOCUMENTS

| 85,794 | 1/1869 | Crosby | 411/87 |
|---|---|---|---|
| 176,335 | 4/1876 | Morton | 411/87 |
| 465,848 | 12/1891 | Gray | 411/87 |
| 1,195,165 | 8/1916 | Baker | 411/87 |
| 1,336,077 | 4/1920 | Hales | 411/87 |
| 1,379,606 | 5/1921 | Ashley | 411/87 |
| 1,574,578 | 2/1926 | Holmes | 403/320 X |
| 2,440,012 | 4/1948 | Haver | 403/360 X |
| 2,758,628 | 8/1956 | Rice | 411/87 |
| 2,890,734 | 6/1959 | Mullin | 411/87 |
| 3,648,749 | 3/1972 | Warren | 411/87 |
| 3,980,337 | 9/1976 | Moberg et al. | 292/319 |
| 4,000,557 | 1/1977 | Bawden et al. | 403/212 X |
| 4,059,866 | 11/1977 | Rohland | 403/212 X |
| 4,131,377 | 12/1978 | Rohland | 403/212 X |
| 4,136,987 | 1/1979 | Tettamanti | 403/284 X |
| 4,157,602 | 6/1979 | Pennell | 403/212 X |
| 5,052,094 | 10/1991 | Plasse et al. | 29/252 |

FOREIGN PATENT DOCUMENTS

| 2361180 | 6/1974 | Fed. Rep. of Germany . | |
|---|---|---|---|
| 1255116 | 1/1961 | France | 411/87 |
| 456171 | 3/1950 | Italy | 411/87 |
| 363821 | 3/1973 | U.S.S.R. | 411/87 |
| 8234 | of 1899 | United Kingdom | 411/87 |

OTHER PUBLICATIONS

Roebling Wire Rope Handbook by The Colorado Fuel and Iron Corp., pp. 1–12.
Society of Automotive Engineers, Inc., Aerospace Standard AS567F, "General Practices for Use in Lock, Wire, Key Washers, and Cotter Pins" Jan. 1, 1980, pp.I-1-I-5.
Military Specification, MIL-W-83420D-25 Apr. 1983.

Primary Examiner—Andrew V. Kundrat
Attorney, Agent, or Firm—Jerome C. Squillaro; John R. Rafter

[57] ABSTRACT

The invention concerns safety cable used to prevent loosening of threaded fasteners. A multi-strand cable is strung through holes in the fasteners and is held in place by sleeves which are crimped over the cable ends. The cable dampens vibration better than solid wire, which is used presently, and, for a given weight of cable, provides greater strength than solid wire, thus saving weight, which is important in aircraft applications.

13 Claims, 3 Drawing Sheets

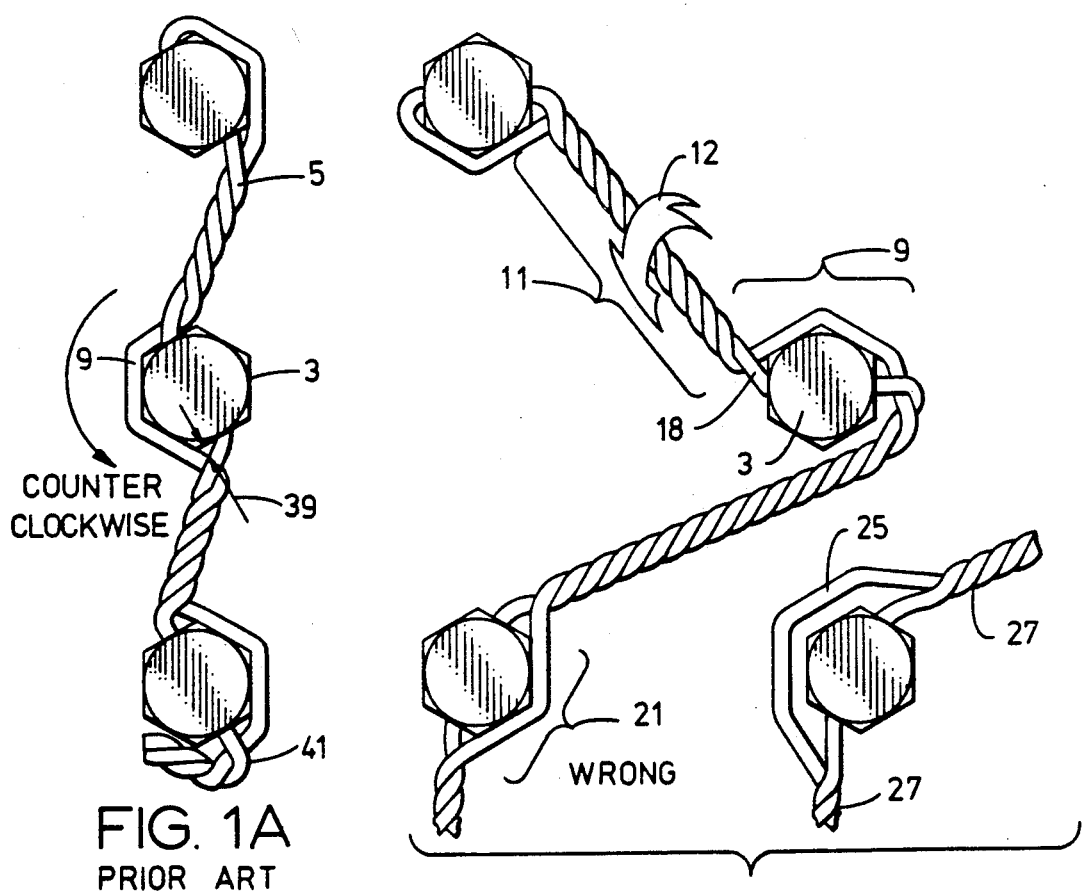
FIG. 1A PRIOR ART
FIG. 1B PRIOR ART
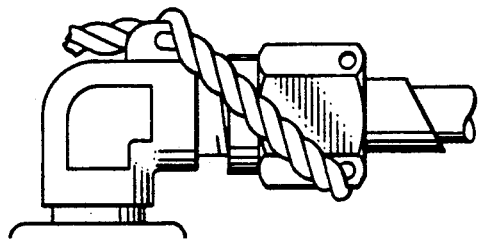
FIG. 1C PRIOR ART
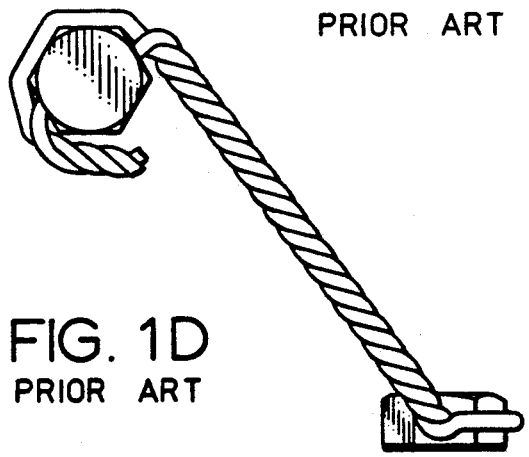
FIG. 1D PRIOR ART
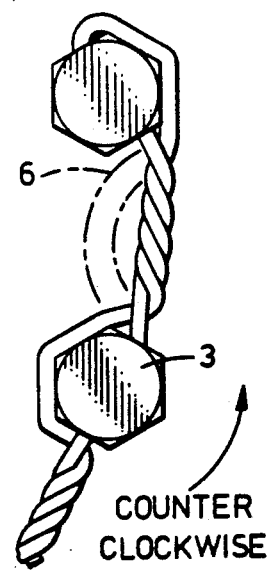
FIG. 1E PRIOR ART

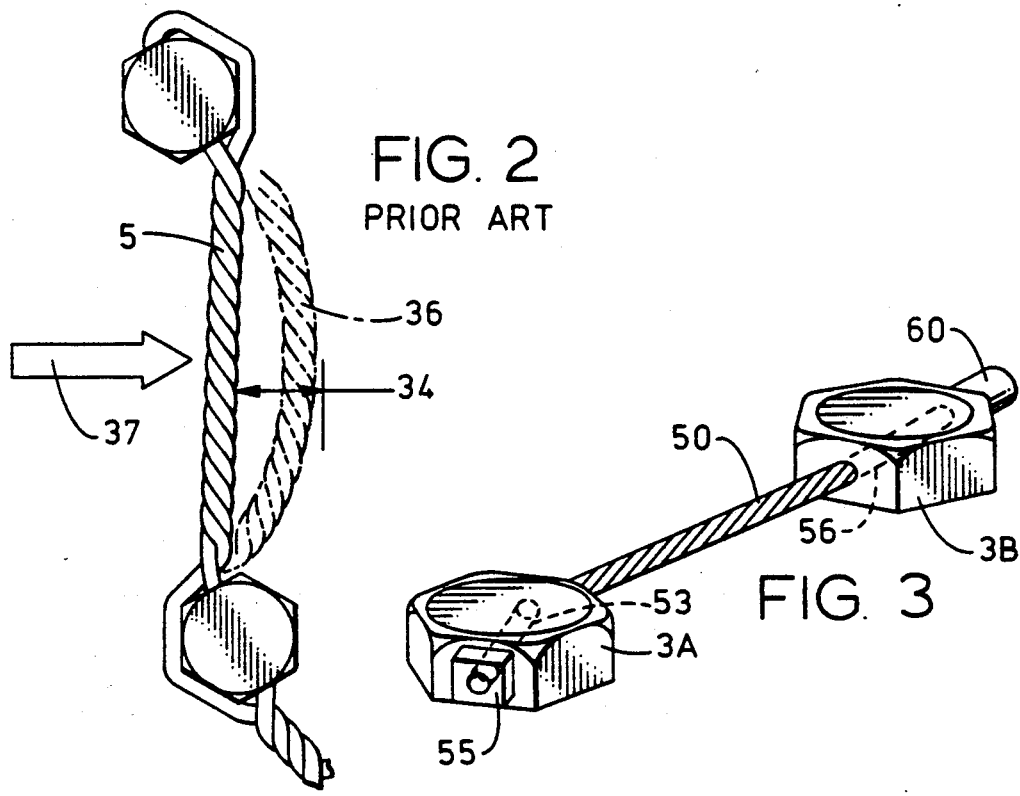
FIG. 2 PRIOR ART
FIG. 3
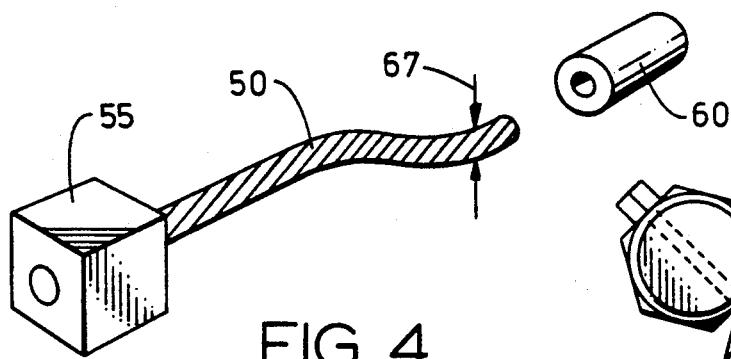
FIG. 4
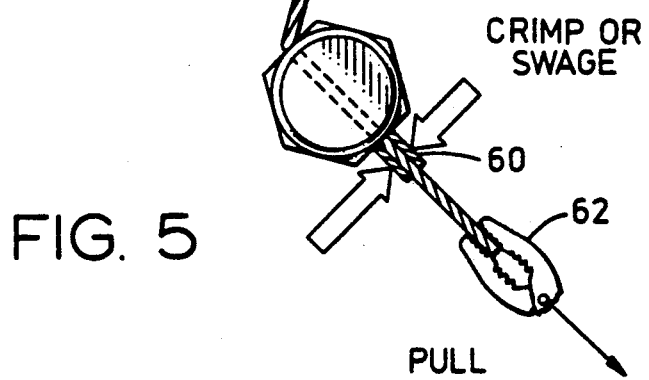
FIG. 5

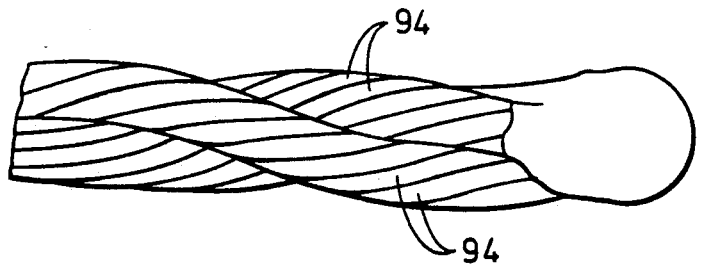
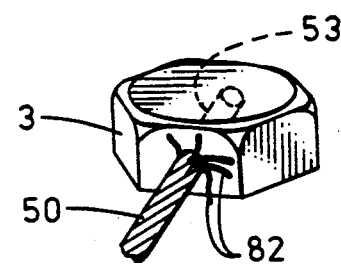
FIG. 6
FIG. 7
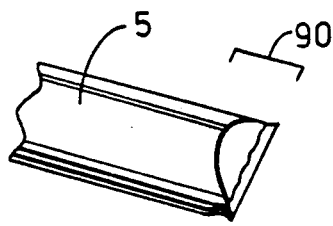
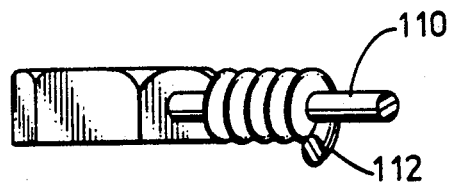
FIG. 8
PRIOR ART
FIG. 9
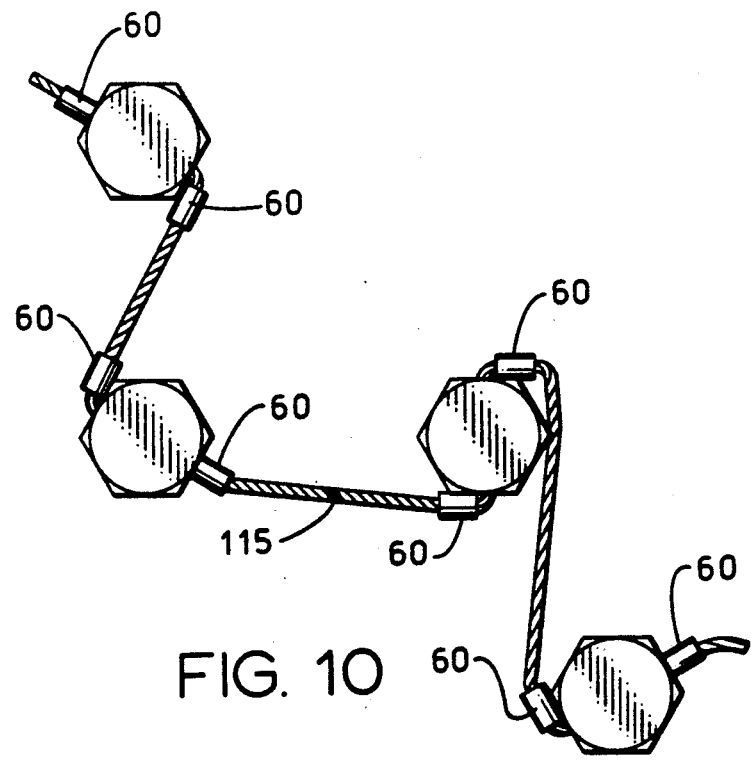
FIG. 10

SAFETY CABLE FOR FASTENERS

This is a continuation, of application Ser. No. 07/324,501, filed Mar. 16, 1989 now abandoned.

The invention relates to tie wire systems which prevent loosening of threaded fasteners. Such loosening can be induced by vibration of machines on which the fasteners are used.

CROSS-REFERENCE TO RELATED APPLICATIONS

This patent application is related to U.S. Pat. No. 5,052,094 issued Oct. 1, 1991, to Bergen Cable Technologies, Inc., for a Lock Wire Securing Tool. This tool can be used to apply safety cable to fasteners in accordance with the present application.

BACKGROUND OF THE INVENTION

Gas turbine engines and other types of machinery are subject to vibration which can loosen nuts and bolts. Safety wire is often used as backup protection in order to prevent the loosening. Safety wiring is the securing together of two or more parts with wire such that any tendency to loosen will be counteracted by an additional tightening of the wire.

Several types of safety wire are shown in FIGS. 1A–1E. Several aspects of these wires should be noted. One, the wire should be positioned such that loosening of a bolt causes an increase, rather than a decrease, in tension of the wire. The increasing tension opposes further loosening. That is, assuming that counterclockwise rotation of bolt 3 in FIG. 1A loosens the bolt, then such rotation tightens wire pair 5, and the tightening inhibits further rotation and loosening of the bolt. However, if the configuration is that of FIG. 1E, the same rotation loosens the wire as indicated by phantom wire 6. This latter configuration must be avoided.

A second aspect is that the direction (clockwise or counterclockwise) of wire twisting must be proper so that the wire section 9 in FIG. 1B which skirts the bolt 3 cannot unravel. That is, for example, the skirting section 9 is part of a counterclockwise-twisted section 11 (counterclockwise direction is indicated by arrow 12.) With this counterclockwise twisting, the skirting section 9 is pinned against rotation by the other wire 18. In contrast, skirting section 21 in FIG. 1B is not pinned in the same manner, and this latter skirting section 21 can rotate into position 25, thus loosening tension on the twisted wire pair 27. Thus, it is required that a skirting section be properly pinned by its companion wire.

A third aspect is that the number of twists per running inch of twisted wire must be held within a predetermined range.

A fourth aspect is that the twisted wire must have a tension which is within acceptable limits. The tension is commonly measured as shown in FIG. 2, wherein deflection 34 of the twisted wire 5 into position 36 under a specified force 37 must not exceed a certain maximum.

A fifth aspect is that the maximum gap 39 between a bolt head 3 in FIG. 1A and the termination point of wire twisting must not exceed a limit, such as one-eighth inch.

A sixth aspect is that the pigtail 41 (i.e., the final length of the locking wire trailing from the last bolt which is fastened) must not exceed a certain length, must have a certain number of twists, and must be bent toward the bolt to assure that the cut ends are not exposed to cause snags.

A seventh aspect is that excessive nicks and kinks in the wire are to be avoided.

In order to properly install a safety wire in all of the preceding aspects, sometimes several attempts are necessary because of the difficulty involved. Further, sometimes a subjective judgement is involved as to whether a given installation is proper. For example, there is no generally agreed standard as to what nicks and kinks are acceptable. Therefore, some quality control inspectors may fail a given wire installation, while others may pass the same installation.

The two facts that (1) the difficulty of the installation requires multiple attempts and (2) some installations are rejected by inspectors when, perhaps, they should not be, cause increased cost in assembling the safety wire installations.

Further information concerning industry practices regarding safety wiring can be found in Aerospace Standard AS567, entitled "General Practices for the use of Lockwire, Key Washers, and Cotter Pins," available from the Society of Automotive Engineers, Inc., 400 Commonwealth Drive, Warrendale, Pa.

OBJECTS OF THE INVENTION

It is an object of the present invention to provide an improved safety cable system for threaded fasteners.

BRIEF DESCRIPTION OF THE DRAWING

FIGS. 1A, 1B, 1D, and 1E illustrate bolts fastened with safety wire in the prior art manner.

FIG. 1C illustrates a tube end fitting fastened with safety wire in the prior art manner.

FIG. 2 illustrates a method of measuring wire tension of the prior art safety wires.

FIGS. 3 and 4 illustrate one form of the invention.

FIG. 5 illustrates installation of the invention.

FIG. 6 illustrates a fused end of the cable 50 in FIG. 4.

FIG. 7 illustrates the fact that frayed strands 82 of a non-fused cable 50 inhibit entry of the cable into hole 53.

FIG. 8 illustrates a chisel point on a prior art safety wire resulting from cutting with a wire cutter.

FIG. 9 illustrates an extreme case of unequal tension sharing in a twisted wire pair.

FIG. 10 illustrates another form of the invention, in which several beads or ferrules 60 are installed.

SUMMARY OF THE INVENTION

In one form of the invention, stranded cable replaces solid wire used as lockwire for bolts. The cable is believed to dampen vibration better than does solid wire. In a second form of the invention, the stranded cable is held in place by sleeves which are affixed to the cable.

DETAILED DESCRIPTION OF THE INVENTION

FIG. 3 illustrates one form of the invention. A wire cable 50 is fed through holes 53 and 56 in two bolt heads 3A and 3B until a bead 55 abuts bolt head 3A. A sleeve or bead 60, also shown in FIG. 4, is then threaded onto the cable. A suitable tension of between 5 and 50 pounds is applied to the cable. In FIG. 5, pliers 62 indicate schematically the application of tension. A crimping tool (not shown), known in the art, deforms the sleeve 60 in order to attach the sleeve onto the cable and prevent withdrawal of the cable from the holes. The end of the cable 50 is cut flush with the end of the bead 60 for safety.

One type of cable 50 is that available as part number 990-01-744, available form Bergen Cable Technologies, Lodi, N.J. This cable is constructed to military specification MIL-W-83420. The cable diameter 67 in FIG. 4 is approximately 1/32 inch. The cable consists of 21 strands, each about 0.006 inch (i.e., six mils) in diameter.

Several important aspects of the invention are the following. One, each cable 50 in FIG. 4 is cut from a longer cable (not shown) using an electric arc cutter, in a commercially available process. This arc cutting provides two advantages. First, the arc cutting bonds the ends of neighboring strands together by welding. This welding prevents unraveling of the individual strands, which is undesirable, because the unraveled strands 82 in FIG. 7 prevent insertion of the cable into a hole 53 in a bolt 3.

A second advantage of arc cutting is that the arc cutting fuses the end of the cable into a rounded shape, shown in FIG. 6, which facilitates installation into the holes 53.

Applicants' fusing is in contrast to the situation existing in prior art locking wires, where a common wire cutter is often used for cutting the wire 5 in FIG. 8. Such cutting leaves a chisel point 90 having a larger diameter than the wire itself and the larger diameter can obstruct installation.

Of course, arc cutting is not strictly necessary to attain bonded and fused ends: Standard cutting can be done, followed by bonding or fusing. Further, the bonding and fusing can be done in one step: the fusing can cause the bonding of cable strands by welding them together.

A second aspect is that cable is believed to be more self-damping under vibration than is solid wire.

A third aspect is that the use of cable eliminates non-uniform wire loading which occurs in the prior art approaches of FIGS. 1A-1E. That is, in the prior art approach, a twisting tool (not shown) grabs the two wires and rotates them in order to twist them into the configuration shown in FIGS. 1A-1E. However, the tool does not always apply equal tension to both wires, and so the wires do not equally share the tension on the twisted pair, as an extreme example will show.

The extreme example is shown in FIG. 9, wherein one wire 110 remains straight, and the second wire 112 is twisted about it. It is clear that the straight wire 110 carries most, if not all, of the tension load of the pair. In general, the twisted wire pairs of FIGS. 1A-1E exhibit this unequal load sharing to some degree.

However, the use of a stranded cable by the invention reduces or eliminates this unequal load sharing because the cable is factory-made under tightly controlled conditions. Such manufactured cable is highly uniform in construction, with the individual strands carefully arranged to equally share load. Therefore, in order to attain a given tensile strength, a smaller total cross section of individual strands can be used because each strand carries an approximately equal share of the total tensile load. Such is not the case with the extreme example of FIG. 9, and is also probably not the case with the configurations of FIGS. 1A-1E. This smaller cross section can provide a weight saving which is important in aircraft applications.

Cable is constructed, for example, to meet the requirements of MILW 83420, which is a Military Specification entitled "Wire Rope, Flexible, for Aircraft Control," and is hereby incorporated by reference.

In this respect, the twisted pairs of FIGS. 1A-1E should not be considered to be a "cable" for at least the reason that breakage of a single wire will destroy the entire "cable", in the sense that "cable" can then be removed from the bolt 3. In contrast, breakage of a single strand of the cable 50 of FIG. 3, irrespective of the location of the break, will not allow removal.

A fourth aspect of the invention is that the cable ties a bolt to an anchor. As shown in FIG. 1C, the anchor is a tab through which a safety wire is threaded. Alternately, the anchor can be another bolt, as in FIG. 1D.

Numerous substitutions and modifications can be undertaken to the invention without departing from the true spirit and scope of the invention as defined in the claims herein. For example, bolts have been described. However, the invention is applicable also to threaded nuts, and threaded fasteners generally. As a second example, additional beads 60 or sleeves can be added as shown in FIG. 10. These added beads act as fail-safe mechanisms in case the original beads fail or the cable breaks at point 115. The added beads prevent the cable from withdrawing from the remaining bolts.

What is desired to be secured by Letters Patent is the invention as defined in the following claims.

We claim:

1. Apparatus for preventing threaded fasteners from loosening, said apparatus comprising:
   a) at least two unitary threaded fasteners having head portions and a fixed hole integrally formed and completely enclosed within and extending through each said head portions;
   b) a single multi-strand flexible cable comprising at least three wires having a first end extending in a first direction entirely through said hole in each of two of said fasteners; and
   c) a first bead bonded to a first end of the cable adjacent a first fastener and a second bead bonded to a second end of said cable extended through said holes and adjacent a second fastener for keeping the cable in place extended through said fasteners.

2. A system for preventing loosening of threaded fasteners, said system comprising:
   a) at least one anchor and at least one threaded fastener, said anchor and said fastener each including a head portion and having a completely enclosed means for receiving a cable therethrough;
   b) a single multi-strand cable having an end bead and comprising at least three wires extending through the enclosed means of the head portions of the fastener and the anchor; and
   c) a second bead bonded to a portion of said cable extended through said enclosed means for fixedly positioning said fastener between said end bead and said second bead for preventing cable detachment from said fastener and said anchor.

3. Apparatus for preventing loosening of a threaded fastener, said apparatus comprising:
   a) two or more unitary threaded fasteners, each having a completely enclosed hole extending therethrough;
   b) a single multi-strand flexible cable comprising at least three wires extending exclusively through each hole; and
   c) two beads, each fixedly bonded to the cable near different fasteners wherein said fasteners are located on said cable between said beads for fixedly attaching said cable to said fasteners for preventing cable detachment from said beads and said fasteners, without severing said cable, and concomitantly causing retention of said fasteners.

4. A safety cable system for threaded fasteners, said system comprising:
 a) two or more threaded fasteners having heads completely enclosing holes therethrough;
 b) a single multi-strand flexible cable of substantially constant cross-section extending only through the holes in the threaded fasteners, and said cable having ends which are rounded and in which the ends of the cable strands are bonded together; and
 c) a pair of beads, each crimped onto opposed end portions of the cable to position said threaded fasteners therebetween and to prevent removal of the cable from the fasteners and at least one of said end portions having been extended through said holes in said fasteners.

5. Apparatus for preventing loosening of a threaded fastener, said apparatus comprising:
 a) a single multi-strand flexible cable of substantially constant cross-section and comprising at least three wires which
  i) extends exclusively through a permanently and completely enclosed hole in the fastener, and
  ii) extends exclusively through a permanently and completely enclosed hole in an anchor;
 b) a first bead on the cable which prevents withdrawal of the cable from the fastener; and
 c) a second bead on the cable which prevents withdrawal of the cable from the anchor wherein said fastener and said anchor are positioned between said first and second beads.

6. Apparatus for tying threaded fasteners together, each fastener including a hole completely enclosed within the head thereof, said apparatus comprising:
 a) a single multi-strand flexible cable of substantially constant cross-section and comprising at least three wires inserted through the holes in the fasteners; and
 b) a first bead attached to a first end of the cable and a second bead attached to a second end of the cable wherein said fasteners are located between said first and second beaded ends.

7. Apparatus according to claim 6 in which the bead is attached to the cable by mechanical deformation of the bead.

8. A method of preventing threaded fasteners from loosening, said method comprising the following steps:
 a) threading a single multi-strand flexible cable of substantially constant cross-section and comprising at least three wires, which has a bead attached to one end, exclusively through a completely enclosed hole in each fastener until the bead approaches one of the fasteners; and
 b) attaching a second bead to the cable near another of the fasteners wherein at least two fasteners are attached between said first and second beads.

9. A method according to claim 8 and further comprising attaching additional beads to the cable in order to prevent withdrawal of the cable from the fasteners if some beads fail.

10. An apparatus for retaining threaded fasteners, said apparatus comprising:
 a) at least two elements selected from the class comprising fasteners and anchors, each of said elements having head portions and a fixed hole integrally formed and completely enclosed within and extending through each of said head portions;
 b) a single multi-strand flexible cable of substantially constant cross-section comprising at least three wires and having a first end extending in a first direction entirely through said hole in each of said two elements; and
 c) a first bead attached to a first end of the cable adjacent one of said elements and a second bead attached to a second end of said cable extended through said of each other of said elements for keeping the cable in place extended through said elements.

11. The apparatus of claim 10 wherein a tension of between 5 and 50 pounds is applied to said cable.

12. A system for retaining threaded fasteners comprising of:
 a) at least two elements selected from the class comprising fasteners and anchors, each of said elements having a fixed hole integrally formed and completely enclosed therein;
 b) a single multi-strand flexible cable comprising at least three wires and having a first end extending in a first direction entirely and exclusively through said hole in each of said two elements; and
 c) a first bead attached to a first end of the cable adjacent one of said elements and a second bead attached to a second end of said cable extended through said hole of said other of said elements for keeping the cable in place extended through said elements.

13. The apparatus of claim 1, wherein the cross-sectional area of said beads is larger than the cross-sectional area of said hole in each of said two fasteners.

* * * * *